United States Patent [19]

Geuenich

[11] 4,207,189
[45] Jun. 10, 1980

[54] FILTER PLATE ASSEMBLY FOR A FILTER PRESS

[75] Inventor: Matthias Geuenich, Langerwehe-Merode, Fed. Rep. of Germany

[73] Assignee: Eberhard Hoesch & Söhne GmbH & Co., Düren, Fed. Rep. of Germany

[21] Appl. No.: 847,651

[22] Filed: Nov. 1, 1977

[30] Foreign Application Priority Data

Nov. 15, 1976 [DE] Fed. Rep. of Germany ....... 2652062

[51] Int. Cl.² ............................................. B01D 25/12
[52] U.S. Cl. .................................... 210/227; 100/115; 100/206; 210/231
[58] Field of Search .............. 100/115, 198, 205, 206; 210/224-231

[56] References Cited

U.S. PATENT DOCUMENTS

| 2,390,628 | 12/1945 | Van Winkle | 210/228 |
| 3,931,014 | 1/1976 | Heimbach et al. | 210/231 |
| 4,053,416 | 10/1977 | Howard et al. | 210/227 |

FOREIGN PATENT DOCUMENTS

| 1184735 | 1/1965 | Fed. Rep. of Germany | 210/224 |
| 6906156 | 10/1969 | Fed. Rep. of Germany | . |
| 1985323 | 3/1971 | Fed. Rep. of Germany | . |
| 500669 | 2/1939 | United Kingdom | 210/229 |
| 817485 | 7/1959 | United Kingdom | 210/228 |

Primary Examiner—Robert H. Spitzer
Attorney, Agent, or Firm—Spencer & Kaye

[57] ABSTRACT

In a filter plate-and-diaphragm assembly for a filter press, which assembly includes a filter plate having a depressed base and a thickened marginal region defining a circumferential sealing edge, and a pressure diaphragm disposed at each side of the plate and having a cup shape to conform to the depressed base of the plate, the, or each, diaphragm is provided with a foldable tongue extending at least over the sealing edge along one side of the plate and securing the diaphragm to at least one lateral edge face of the plate.

11 Claims, 11 Drawing Figures

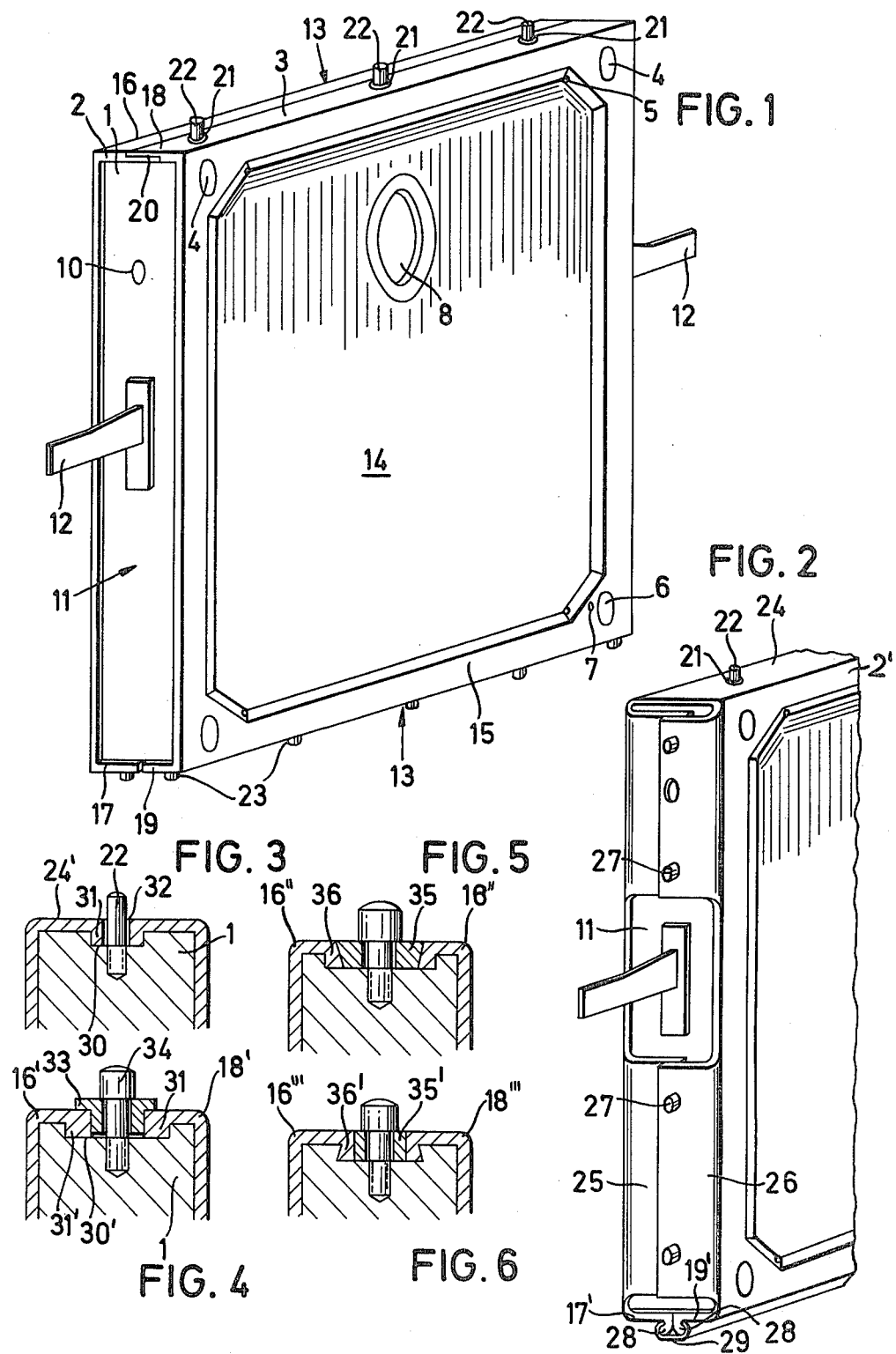

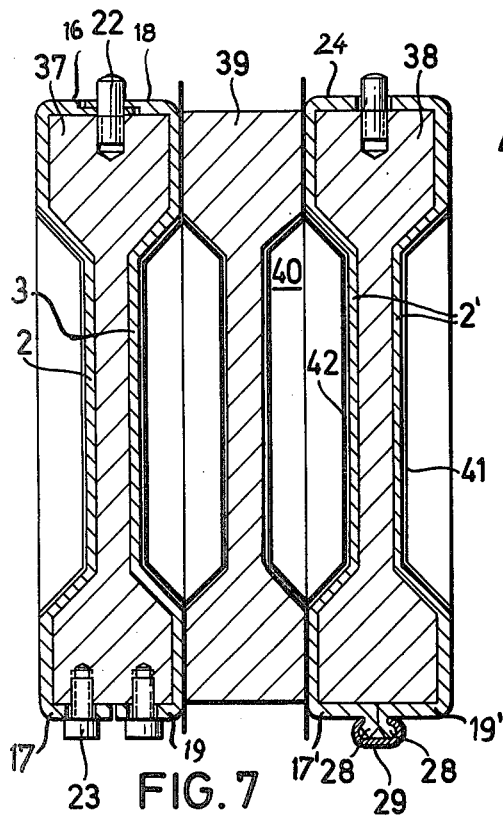
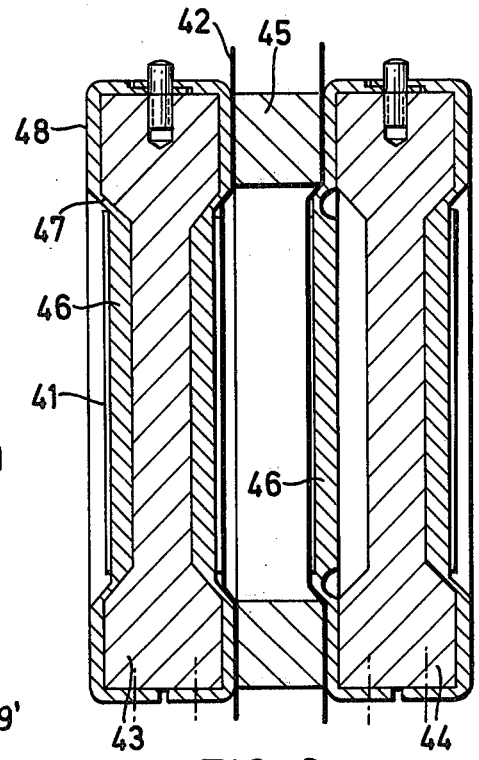
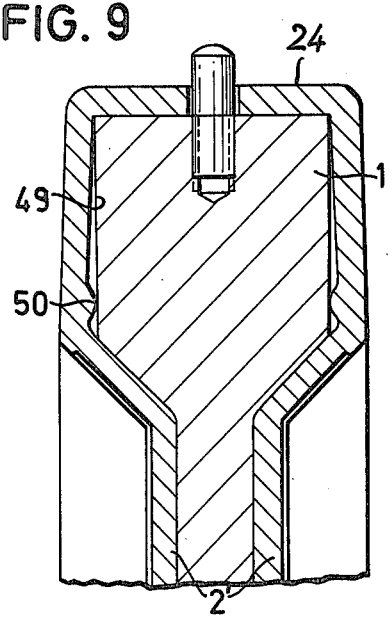
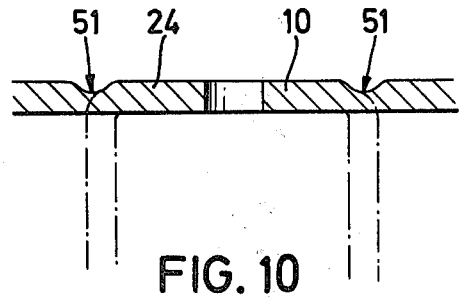
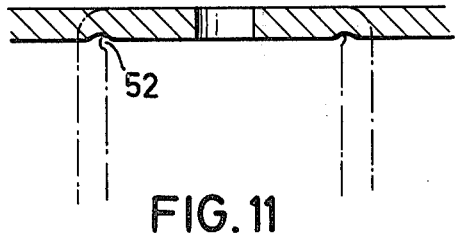

FILTER PLATE ASSEMBLY FOR A FILTER PRESS

BACKGROUND OF THE INVENTION

The present invention relates to a filter plate-and-diaphragm assembly for a plate or frame filter press of the type including a filter plate provided with a depressed base and a thickened peripheral portion defining a circumferential sealing edge, and a pressure diaphragm provided on each side of the plate and having a cup shape in order to conform to the shape of the depressed base of the plate.

In known diaphragm plates, the pressure diaphragm is connected with the plate or to a corresponding frame by means of an adhesive or by vulcanization. Replacing the diaphragm without damaging the wall or frame portions is almost impossible and is, in any event, very time consuming.

German Offenlegungsschrift [Laid-open Application] No. 23 22 044, and corresponding U.S. Pat. No. 3,931,014 to Heimbach et al, discloses a cup-shaped diaphragm which has a dovetail-shaped edge via which it is fixed in a corresponding groove of the plate. This construction makes it possible to achieve a good yield from the filter cakes even in the edge regions and to operate successfully with locking forces which are as low as possible for the packet of plates formed from a plurality of such assemblies. Since the dovetail joint must fit precisely between the pressure diaphragm and the plate, its manufacture is relatively expensive.

For the purpose of facilitating connection of the plate and the pressure diaphragm, German Utility Model Pat. No. 19 85 323 discloses an overhanging diaphragm which rests on the upper edge of the plate, with no firm connection of the diaphragm edge with the plate edge, and hangs down smoothly toward the bottom. Since no special fastening elements are provided, such a diaphragm cannot be used as a cup diaphragm as it is liable to be displaced from its position with respect to the plate when the filter press is opened. Therefore, all plates must be checked to see that the overhanging diaphragms are in their correct position before the plate packet of the filter press in question is closed. Automatic operation is thus practically impossible.

German Utility Model Pat. No. 69 06 156 discloses another overhanging diaphragm which is also planar but which, in contradistinction to the above-described known overhanging diaphragm, has its smooth edge region clamped into a frame which is connected with the plate so that, during opening of the filter press, the plate, diaphragm and frame can be displaced as a unit. Since the diaphragm is planar, the diaphragm material will be stretched considerably along the inner clamping edge when it is charged with pressure medium from the rear. Furthermore, due to the planar design of the pressure diaphragm, the filter cake will not be sufficiently pressed in its edge regions. This solution is expensive from a production point of view since, for each diaphragm, the clamping edge of the plate as well as that of the clamping frame must be machined to be perfectly planar and parallel to one another. Also, replacement of such a diaphragm is made mroe difficult in that initially the clamping frame must be removed from the plate before the diaphragm can be lifted off.

SUMMARY OF THE INVENTION it is an object of the present invention to provide a filter plate-and-diaphragm assembly with which it is possible to properly press out the filter cake even in the edge zones of the filter chambers and which permits easy and economical replacement of the diaphragms.

This and other objects of the invention are accomplished, for an assembly of the above-mentioned type, by providing the pressure diaphragm with a tongue which extends at least over the sealing edge along the upper side of the plate and which can be folded over to fasten the pressure diaphragm to the associated peripheral, or lateral, edge face of the filter plate.

This assures secure fixing of the pressure diaphragm even if the latter is a so-called cup diaphragm. Since the fastening means lie in the region of the outer narrow lateral, or peripheral, edge faces of the plate, they are easily accessible at any time so that the pressure diaphragm can be removed and lifted out of the press frame and replaced by a new pressure diaphragm without the filter plates being lifted out. It is particularly advisable to provide the pressure diaphragm with fixable tongues at the upper and the lower lateral edge faces of the plate. A plate of such design provides a dependable seal for the edge regions of the pressure diaphragm at the filter chamber side as well as at the pressure chamber side without requiring special measures in the area of the sealing edge of the plate. As a result, the plates are more economical to produce.

According to one preferred embodiment of the invention, the tongue is provided with a plurality of apertures and the diaphragm is fixed on the associated peripheral edge face of the plate by means of bolts which engage with the apertures in the tongue. It is of particular advantage if at least some of the bolts are plug-in bolts. This permits the openings of the pressure diaphragms to be hooked over the plug-in bolts, which are preferably provided at that peripheral edge face of a plate when the latter is positioned in a filter press, while the diaphragms are also secured to the lower peripheral edge face of the plate by means of threaded bolts so as to secure them against displacement.

According to another preferred embodiment, attachment of the pressure diaphragm to the plate is effected by providing the edge of the tongue with a bead and fixing the bead to a counterbead by means of at least one clamp which passes around both beads. In this case the counterbead may be formed by correspondingly shaping the associated peripheral edge face of the plate or, in a particularly advantageous manner, the counterbead can be constituted by the head of the pressure diaphragm which is disposed on the other side of the plate.

According to another preferred embodiment of the invention, both pressure diaphragms of a diaphragm plate are contiguous, or of one piece, and have a common tongue located in the region of one frontal face of the plate. This further simplifies the fastening of such a double diaphragm to the plate.

According to another preferred embodiment of the invention, which is particularly advantageous for a one-piece double diaphragm structure, the peripheral region of the pressure diaphragm which encloses the sealing edge along one side of the plate has a region of reduced thickness in the area between the sealing edge and the tongue. This permits the tongue to be manufactured as a flat item, be it for an individually fabricated pressure diaphragm or a one-piece double diaphragm, and to nevertheless rest tightly against the peripheral edge face of the plate after being folded over without the diaphragm material being stressed to an unduly great extent in the edge regions.

According to another advantageous embodiment of the invention, at least the upper peripheral edge face of the plate is provided with a continuous groove extending parallel to the major plate surfaces and the associated tongue of the pressure diaphragm is provided with a thickened portion to correspond to the groove. In cooperation with the bolts, be they plug-in bolts or screw bolts, a form-locking connection is thus assured between the plate and pressure diaphragm or diaphragms, which is effective over the entire width of the plate, i.e. the entire length of the upper peripheral edge face, and which also prevents shifting of the pressure diaphragm with respect to the plate in individual zones. According to a further feature of this embodiment of the invention, a clamping ledge for fixing the thickened portion of the tongue in the groove is fastened in the groove. This arrangement is particularly significant for larger filter plates in which there might exist the danger that the weight of the pressure diaphragm would warp the diaphragm in the region of the tongue and thus produce spots in which the seal is broken during locking of the filter plate packet.

According to another advantageous embodiment of the invention, the, or each, pressure diaphragm is provided on its side facing the plate, in the area of the sealing edge of the plate, with a sealing bead corresponding to the sealing edge. This sealing bead is the first to absorb the locking force when a packet of plates is pressed together, while the remaining sealing surface regions of the diaphragm are pressed only during further compression. This assures, even for pressure diaphragms which are fastened only to the upper and lower edge of the press, that the rear of the diaphragm is safely sealed against the pressure of the pressing means when the plate packet is locked. It is of particular advantage here in the transition between the sealing bead and the adjacent surface regions of the pressure diaphragm is made gradual.

According to a further advantageous embodiment of the invention, the central portion of the diaphragm which corresponds to the depressed base of the plate is made relatively stiff and is connected with the portions of the pressure diaphragm contacting the sealing edge of the plate by means of a flexible portion surrounding the central portion. Such an embodiment, in which advisably the depressed base of the plate and the central portion of the diaphragm are made shallower than in conventional cup diaphragms, can be used with advantage for so-called frame filter presses in which a frame is provided between very two filter plates and covers only the respective sealing edge of adjacent plates. In such presses, each frame and the two filter plates adjacent thereto define the filter chamber, with the slurry entering the filter chamber via the frame. With the central portion of the diaphragm, which defines the base of a depression, being stiff, it can move into the filter chamber delineated by the frame in the manner of a piston when the press is supplied with pressure medium, generally at the end of a filtering cycle, so that the filter cake then contained in the filter chamber is pressed uniformly in practically all regions.

BRIEF DESCRIPTION OF THE DRAWINGS

FIG. 1 is a perspective view of a filter plate-and-diaphragm assembly according to a first preferred embodiment of the invention, the assembly being shown in the orientation it will have in a filter press.

FIG. 2 is a view similar to that of FIG. 1 of a portion of an assembly according to another embodiment of the invention.

FIGS. 3, 4, 5 and 6 are cross-sectional, detail views of various embodiments of fastening structures according to the invention for fastening diaphragms to the peripheral end face of a plate.

FIG. 7 is a cross-sectional side view of a packet composed of two assemblies according to the invention together with a chamber plate.

FIG. 8 is a view similar to that of FIG. 7 showing assemblies according to another embodiment of the invention together with a frame, the arrangement being in an operating state.

FIG. 9 is a cross-sectional, detail view of a portion of an assembly according to the invention, to an enlarged scale, showing the arrangement of a sealing bead.

FIGS. 10 and 11 are cross-sectional detail views showing designs for the tongue of a one-piece double diaphragm according to the invention.

DESCRIPTION OF THE PREFERRED EMBODIMENTS

FIG. 1 illustrates a first embodiment of an assembly, according to the invention which corresponds to the left-hand assembly shown in FIG. 7. This assembly includes a filter plate 1 having a depressed, or thin, central region creating a depression 14 in each one of its two major surfaces. The assembly further includes two pressure diaphragms 2 and 3, each disposed against a respective major surface of plate 1 and each secured to the plate.

Each diaphragm 2, 3 is also formed to normally have a cup shape to conform to the depression in its associated major surface of plate 1 so that it rests against practically the entire surface area of the plate surface in question. Plate 1 and pressure diaphragms 2 and 3 are provided in the usual manner with ports 4, 5, 6 and 7 for ventilation or for the intake and discharge, respectively, of washing agents, and which define the respective inlet and outlet channels of a filter plate packet.

The depression is further provided with a passage 8 which passes through the plate and through both diaphragms and which forms the slurry inlet channel for the filter press. A further port 10 is provided in a vertical, or side, peripheral edge face 11 of the plate 1 for introduction of a pressure medium, port 10 communicating with a channel opening into the region between plate 1 and each diaphragm. Moreover, protruding tongues 12 are provided on both vertical peripheral edge faces 11 of the plate 1 so as to support the plate on respective traverses of the filter plate frame. For filter plate assemblies which are to be mounted in a suspended manner, appropriate suspension means can be provided at the upper peripheral edge face 13, these means not being illustrated herein.

The depression 14 in each major surface of the filter plate is surrounded on all sides by a circumferential sealing edge 15 against which rests a corresponding sealing edge of an adjacent filter plate-and-diaphragm assembly, or, as shown in FIG. 7, a corresponding sealing edge of an adjacent chamber plate in a chamber filter press, or, as shown in FIG. 8, a corresponding sealing edge defined by a frame in a frame filter press.

In the embodiment illustrated in FIG. 1, each of diaphragms 2 and 3 is provided with respective tongues 16, 17 and 18, 19, which protrude beyond the top and bottom sides of the sealing edge 15 and contact the top and bottom peripheral edge faces 13 of the filter plate. The upper tongues 16 and 18, or diaphragms 2 and 3, respectively, are provided at an edge zone 20 with undercut portions to form a lamp joint which has the same thickness as the remaining portions of those tongues.

Openings 21 are provided in tongues 16, 17, 18 and 19 through which bolts 22 or 23, respectively, are inserted for connection with the filter plate. As can be seen in the left-hand assembly of FIG. 7, openings 21 in tongues 16 and 18 are aligned with one another and the upper bolts 22 are here designed as plug-in bolts which are pushed into plate 1, while the lower bolts 23 are designed as threaded, or screw bolts whose heads press the tongues 17 and 19, respectively, against the bottom peripheral edge face 13 of the plate.

FIG. 2 shows another embodiment of an assembly according to the invention provided with the same filter plate 1 as the embodiment of FIG. 1. In FIG. 2, the diaphragms are designed as a so-called double diaphragm 2′; that is, both parts of the diaphragm are made of one piece and are interconnected via a common "tongue" 24. Corresponding to the embodiment of FIG. 1, openings 21 are provided in the common tongue 24 for receiving bolts 22 which are connected to the plate. Furthermore, in this embodiment the diaphragms are provided with respective tongues 25 and 26 located in the region of each vertical, or side, peripheral edge face 11 of the plate. Tongues 25 and 26 are secured to each face 11 in a manner similar to that employed for tongues 16 and 18 of FIG. 1 by means of bolts 27 and associated openings in the tongues and in each face 11.

In this embodiment, fastening of the tongues 17′ and 19′ in the area of the bottom peripheral edge face of plate 1 is effectuated by giving the tongues thickened portions, or beads, 28 at their edge regions and by holding by the beads together by a clamp 29 which extends across the entire length of bottom face 13. This embodiment is also shown as the right-hand assembly in FIG. 7.

FIGS. 3 to 6 show various embodiments of the structure for fixing the tongues of pressure diaphragms to either the top or bottom peripheral edge face of plate 1, as well as to the side, or vertical, peripheral edge faces of a plate.

The embodiment shown in FIG. 3 shows one arrangement for fastening the common tongue of a double diaphragm of the type shown in FIG. 2. In this embodiment, a continuous groove 30 is cut into one peripheral edge face of plate 1 and the common "tongue" 24′ is provided with a corresponding thickened portion 31 which can mate with the groove. Openings 32 to accommodate bolts 22 are provided at appropriate spacings in the region, and along the length, of the thickened portion 31.

The embodiment shown in FIG. 4 represents one way of fastening individual diaphragms of the type shown in FIG. 1 to the filter plate. Here, too, a continuous groove 30′ is provided in the peripheral edge face of plate 1 and a thickened portion 31′ is provided at the edge of each tongue 16′ and 18′ associated with the groove. These thickened portions are inserted into the groove 30′ and are firmly clamped to the plate 1 by means of a continuous T-shaped strip 33 and screw bolts 34.

FIGS. 5 and 6 show modifications of the embodiment of FIG. 4 in which the appropriate shaping of strip 35 or 35′, respectively, and the associated thickened portions 36 of tongues 16″ and 18″ or 36′ of tongues 16‴ and 18‴, respectively, produce two forms of dovetail connection. In the embodiment of FIG. 5, this is achieved by providing plate 1 with a groove of rectangular cross section and tapering strip 35 and thickened portions 36. In the embodiment of FIG. 6, the groove in plate 1 has the form of a dovetail mortise, thickened portions 36′ are correspondingly shaped and strip 35′ has a rectangular cross section. The two arrangements could also be combined, i.e. the groove in plate 1 could have the form shown in FIG. 6, the strip could have the form of strip 35 of FIG. 5 and the thickened tongue regions could be formed to mate with the groove and the strip.

FIG. 7 is a schematic view of the structure of a filter plate packet for a chamber filter press. In this embodiment a chamber plate 39 is disposed between every two plate-and-diaphragm assemblies 37 and 38 which correspond in structure to the embodiments of FIGS. 1 and 2, respectively. The chamber plate 39 is here provided with a depressed base presenting a depression 40 at each side thereof, in the same manner as the filter plates. The mutually facing depressions of each filter plate and chamber plate form a filter chamber. In order to construct the entire filter plate packet, further chamber plates and filter plate-and-diaphragm assemblies follow in alternation and are held in a known manner in a frame (not illustrated) to be firmly pressed together, for the filtering and pressing processes, by a preferably hydraulic locking device.

The chamber plate 39 as well as the diaphragms 2, 3 and 2′ of the diaphragm plates 37 and 38 are provided with channels 41, the channels in each being covered by a filter cloth 42 through which channels the filtrate which has passed through the filter cloth can flow off via filtrate removal channels at the bottom of each chamber. The channels are not shown in detail since they are well-known in the art.

FIG. 8 shows the basic structure of a filter plate packet of a frame filter press. This embodiment is composed of two filter plate-and-diaphragm assemblies which correspond generally to the embodiment of FIG. 1 but are provided with somewhat shallower central depressions defining the filter chambers. A frame 45 which contacts only the area of the sealing edges of the filter plates 43 and 44 is sandwiched between those plates. Each filter chamber of this type of filter press is axially delimited by the two mutually facing depressions in filter plates 43 and 44 and in the peripheral direction generally by frame 45. In this embodiment as well, the pressure diaphragms are provided with channels 41 in the area of the depressions and are each covered by a filter clotch 42. In this embodiment the slurry is introduced in a known manner through channels provided in the frame.

According to a modification of the structure shown in FIG. 7, the diaphragms of the embodiment shown in FIG. 8 each have a central portion 46, conforming to the bottom the depression in its associated filter plate face, which is relatively stiff compared to the other diaphragm portions. Central portion 46 is connected with the peripheral portions 48 of the diaphragm which lie against the sealing edge of the plate via flexible connecting portions 47 surrounding stiff portion 46. If now the space between a plate and a pressure diaphragm is charged with a pressure medium, the area 46 forming the bottom of the pressure diaphragm moves into the filter chamber enclosed by filter frame 45, as shown at the left-hand side of the filter plate 44, in the manner of a piston so that the filter cake disposed in the filter chamber is compressed practically uniformly over its entire surface area. The above-described pressing state is shown in FIG. 8 and described only for the left-hand pressure diaphragm of the filter plate 44. In practice the procedure is such that all pressure diaphragms of a filter plate pocket are charged simultaneously with pressure medium and the cakes of all filter chambers are pressed out simultaneously. That means that the left-hand pressure diaphragm of filter plate 44 and the right-hand pressure diaphragm of filter plate 43 simultaneously effect a piston-like movement which acts on the filter cake enclosed between them. The same also applies for the filter chambers to the left of plate 43 and to the right of plate 44.

FIG. 9 shows, in a vertical sectional view through the upper portion of an assembly provided with a double diaphragm of the type shown in FIG. 2, how the region between plate 1 and pressure diaphragm 2' which receives pressure medium, is sealed off. This is effected by a circumferential sealing bead 50 provided on each diaphragm in the area of, and facing, the assoicated sealing edge 49 of plate 1. Each bead 50 is formed to present a smooth transition toward the side of the depressed base of plate 1 as well as toward the peripheral edge face so that excess stress on the diaphragm material is avoided in this area during pressing together of the filter plate packet. The sectional view of FIG. 9 shows the form assumed by each bead 50 in a relaxed, i.e. uncompressed, state. With the filter plate packet closed, i.e. when the full closing pressure is exerted on the sealing edge 49, the sealing bead 50 is compressed to such an extent that the corresponding edge regions of the pressure diaphragm rest on the sealing edge across their full width.

A further advantage of this arrangement is that upon the closing of the filter plate packet, the filter chambers produced by this closing action are initially sealed along the line of contact of each bead 50, and then by the fact that the entire surface of the sealing edge is contacted, since bead 50 causes the edge zone of the pressure diaphragm, in the relaxed state, to initially set itself at an angle to sealing edge 49, all edges 49 being planar and parallel to one another in all filter plates, and chamber plates or filter frames.

The embodiment shown in FIG. 9 for sealing the pressure medium chamber as well as the filter chambers can be used not only for one-piece double diaphragms but also for two-piece pressure diaphragms if it is adapted accordingly. For reasons of clarity it must be pointed out that in the rest state there is no "pressure medium chamber" as such since each pressure diaphragm rests against the entire surface area of its associated plate 1 during the slurry intake. Only when the rear of a diaphragm is charged with pressure medium through the pressure medium channel (not shown in detail) which is in communication with the inlet opening 10 (FIG. 1) will the portion of the pressure diaphragm which lies in a depression of plate 1 be raised so that the filter cake is compressed accordingly and an increasing space is created between the pressure diaphragm and the plate surface, which space fills with pressure medium. At the end of the pressing process, the pressure medium is withdrawn from this area so that the pressure diaphragm can contact the plate again over its entire surface area.

The sectional views of FIGS. 10 and 11 show forms of construction for embodiments of one-piece double diaphragms. In these embodiments narrow regions 51 which enclose respective plate corners on both side of "tongue" 24 are given a lesser thickness than the adjacent diaphragm regions so that, since such double diaphragms are manufactured as flat bodies, they can be bent downwardly in the shape of a U along the dot-dash lines without being overly stressed. In the embodiment of FIG. 10 the reduced thickness is produced by forming outwardly oriented grooves, while in the embodiment of FIG. 11 the reduction in thickness is effected by the provision of inwardly oriented grooves. Accordingly, in the embodiment of FIG. 11, a groove 52 is formed along a corresponding filter plate corner after the diaphragm has been turned into the dot-dash configuration.

The opening 8 for passage of the slurry and possibly also openings 4, 5, 6 and 7, all shown in FIG. 1, are sealed in a known manner by appropriate sealing means, which can be screwed- or pressed-in sealing rings or beads shaped onto the diaphragm in one piece.

With appropriate structural modifications, filter plates having the above-described features can also be used for filter presses and automatic filter presses having horizontally disposed filter plates. The modification involved here essentially does not apply to the design of the diaphragms but to the shape of the filter plate, and particularly its suspension in the press frame, etc.

It will be understood that the above description of the present invention is susceptible to various modifications, changes and adaptations, and the same are intended to be comprehended within the meaning and range of equivalents of the appended claims.

What is claimed is:

1. In a filter plate-and-diaphragm assembly including a filter plate having a depressed central portion and a peripheral portion surrounding the central portion and defining a sealing edge at each side of the plate as well as peripheral edge faces extending between the sealing edges, the central portion defining a depression at each side of the plate, and two pressure diaphragms each disposed at a respective side of the plate and presenting a cup-shaped central portion conforming to the depression at its associated side of the plate and a marginal portion in sealing contact with the sealing edge at its associated side of the plate, the improvement wherein each said diaphragm is provided with two tongues each extending from a respective opposed edge of said marginal portion and via which said diaphragm is secured against at least two peripheral edge faces of said plate and both of said diaphragms are constituted by a one-piece member having a common portion defining one said tongue of each said diaphragm, and said assembly further comprises first attachment means securing said common portion to the peripheral edge face of said plate associated with each said one tongue, and second attachment means securing the other tongue of each said diaphragm against the peripheral edge face of said plate associated with said other tongues.

2. An arrangement as defined in claim 1 wherein said plate is arranged to be vertically oriented in a filter press and one said tongue of each said diaphragm is secured to that edge face of said plate which will be located at the top when said plate is so oriented.

3. An arrangement as defined in claim 1 wherein said tongues of each said diaphragm are provided with a plurality of openings, and said first and second attachment means comprise bolts passing through said openings and secured in said at least two peripheral edge faces of said plate for fixing each said diaphragm to said plate.

4. An arrangement as defined in claim 3 wherein at least some of said bolts are screw bolts.

5. An arrangement as defined in claim 3 wherein at least some of said bolts are plug-in bolts.

6. An arrangement as defined in claim 1 wherein said second attachment means comprise a bead provided along the edge of said other tongue of each said diaphragm, and a clamp securing said beads together for securing said diaphragm against said peripheral edge face associated with said other tongues.

7. An arrangement as defined in claim 1 wherein each said diaphragm is provided with a region of reduced thickness between said common portion and said marginal portion of each said diaphragm and coinciding with the boundary between said at least one peripheral edge face and said sealing edge at its associated side of said plate.

8. An arrangement as defined in claim 1 wherein said peripheral edge face of said plate associated with said other tongues is provided with a continuous groove and said other tongue of each said diaphragm is provided with a corresponding thickened portion engaging in said groove.

9. An arrangement as defined in claim 8 wherein said second attachment means comprise a clamping ledge engaging in said groove for securing said thickened portion of each said other tongue in said groove.

10. An arrangement as defined in claim 1 wherein each said diaphragm is provided at its side facing said plate and on said marginal portion, with a continuous sealing bead which extends along said sealing edge at its associated side of said plate.

11. An arrangement as defined in claim 1 wherein said central portion of each said diaphragm includes a stiff interior region corresponding to the bottom of the depression at its associated side of said plate, and an elastic outer region flexibly connecting said interior region to said marginal portion of said diaphragm.

* * * * *